Jan. 9, 1923.
C. O. COZZENS.
EYE PROTECTOR.
FILED MAR. 22, 1920.
1,441,786.
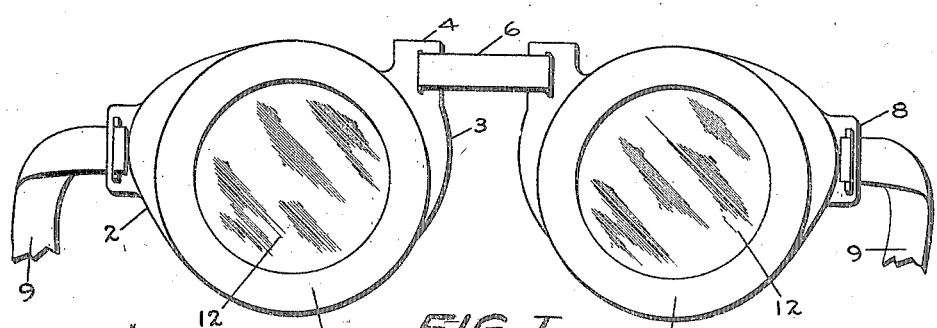
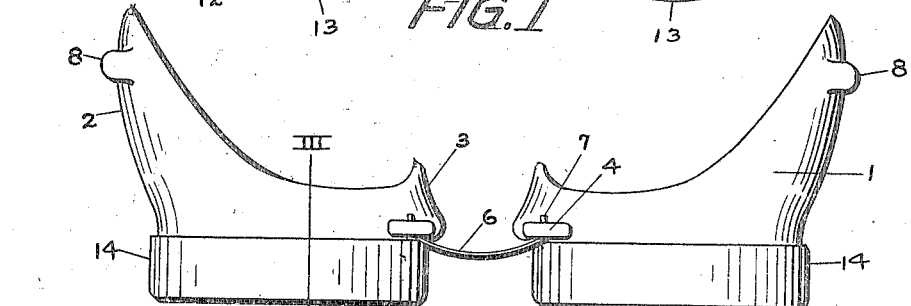
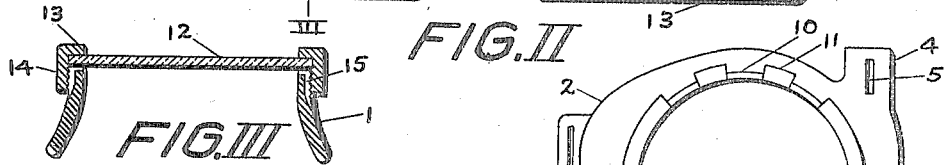
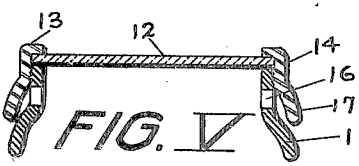
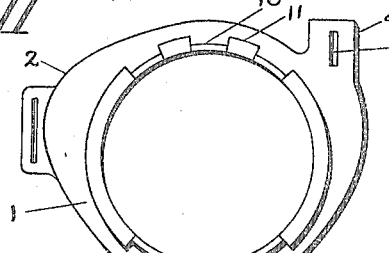
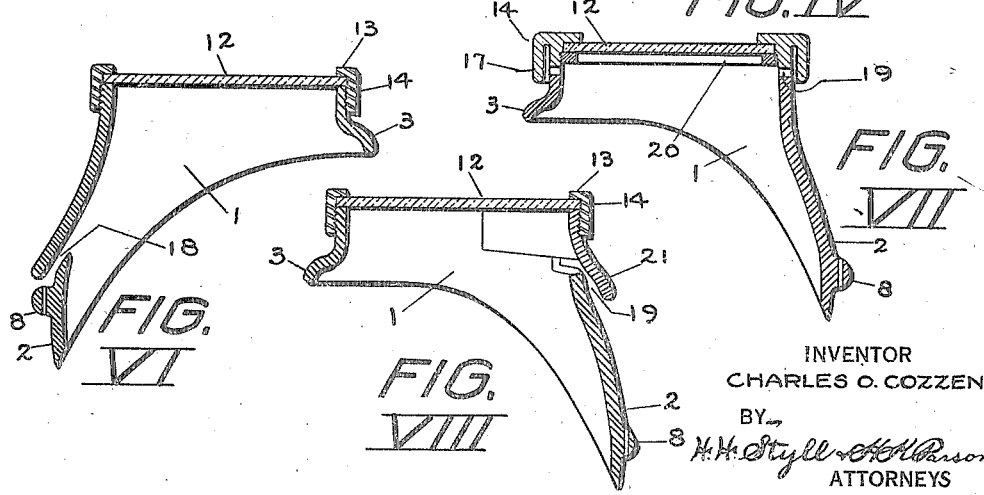
INVENTOR
CHARLES O. COZZENS
BY
ATTORNEYS Patented Jan. 9, 1923.

1,441,786

UNITED STATES PATENT OFFICE.

CHARLES O. COZZENS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

Application filed March 22, 1920. Serial No. 367,680.

*To all whom it may concern:*

Be it known that I, CHARLES O. COZZENS, a citizen of the United States, residing at Southbridge, in the county of Worcester and State of Massachusetts, have invented certain new and useful Improvements in Eye Protectors, of which the following is a specification.

This invention relates to improvements in eye protectors and has particular reference to an improved type of protector especially adapted for use in welding or similar industries.

One of the principal objects of the present invention is the provision of a novel and improved type of goggle or eye protector capable of general use, but particularly applicable to welding operations, which shall be provided with improved simple and efficient means for securing proper and desired ventilation of the interior of the eye cup, while absolutely preventing any direct heat or light radiations from entering said cup.

A further object of the present invention is the provision of a novel and improved construction of eye protector which shall be so constructed as to automatically adapt itself to varying configurations of faces to make a proper tight and comfortable fit with said faces, and which while so properly fitting and conforming to the requirements of the individual wearer shall be constructed to make use of a standard size and shape of lens.

Other objects and advantages of my present invention should be readily apparent by reference to the following specification taken in connection with the accompanying drawings, and it will be understood that I may make any modifications in the specific details of construction shown and described within the scope of the appended claims without departing from or exceeding the spirit of the invention.

Figure I represents a front view of a protector embodying my improvements.

Figure II represents a plan view thereof.

Figure III represents a vertical sectional view taken as on the line III—III of Figure II.

Figure IV represents a front view of the eye cup with cap and lens member removed.

Figure V represents a view similar to Figure III, illustrating a modified form of the invention.

Figure VI represents a similar view of another construction thereof.

Figure VII represents a view of an interior instead of exterior lens holding member.

Figure VIII illustrates another type of ventilation.

In the construction of eye protectors for those engaged in welding or similar operations, in the past difficulty has been experienced due to the fact that it is quite undesirable to make use of metal eye cups and the like on account of the intense heat to which the parts are subjected, so that composition or non-metallic members of larger size and bulk incapable of bending adjustments possible with ordinary metal forms of protection have been required.

A further difficulty experienced in this direction is that of securing proper ventilation so that the inside of the eye cup when tightly held against the face will not become dried up by the heating operations, causing discomfort to the wearer, but in which there shall be a free circulation of air counteracting this drying up effect. Care, however, has to be taken that in securing this circulation of air no direct light radiations enter the cup to cause injury to the vision of the wearer through the presence of harmful radiations or intense heat.

In the attainment, therefore, of the foregoing advantages I form my improved eye protector with a cup portion 1, provided with a rearwardly deflected curving skirt portion 2 of shape to fit around the side of the face of the wearer, and with a central slightly inwardly curved bearing portion 3 adapted to fit into the socket between the side of the nose and the eye, the portion 3 being provided with a lug 4 slotted as at 5 to receive the bridge member 6. Said bridge member 6 is of flexible material and has ears 7 securing it in position within the slot. The skirt 2 is likewise formed with a slotted lug 8 to receive the head band 9 for retaining the protector in position.

In that form of the invention illustrated in detail in Figures III and IV, is to be found one embodiment of my improved ventilation structure, in that the cup 1 is provided on its front face with the notches 10 leaving the upstanding abutment lugs 11 against which rest the lens 12 secured in position by the flange 13 of the screw cup 14 which screws around the outer face of the lug 11. It will thus be seen that a space is provided at the notches 10 between the lens and adjacent portion of the cup wall 2, while communicating with this space is the recess or groove 15 formed by grooving or milling a slot in the side of the cup communicating with the notch 10, as should be best understood by a comparison of the structure shown in Figures III and IV. There is thus a plurality of air circulation or ventilation passages formed by the combined effect of the notches 10 and grooves 15. Ingress of either foreign particles, rays of light or the like, is prevented by the fact that the outer wall or cup 14 is screwed over the lugs 11 on their outer side to at one time hold the flange portion 13 in place, clamping the lens 12 against the outer face of the lugs and overlying the major portions of the passages 15 so that any light rays tending to enter the cup at the passage must extend up through the curved passage and then bend at right angles through the cup wall 2 so that all light, heat or chemical rays are excluded from the interior of the cup, although perfect ventilation is obtained, while the liability of flying particles entering the same is reduced to a minimum.

In Figure V, I have shown a slightly modified form of the invention, in which in place of the grooves and notches the wall of the cup 1 is provided with apertures 16 overhung by the skirt 17 on the lens holding cup 14, producing substantially the same effect as in Figure III, although with a slightly different type of construction.

Figure VI illustrates a molded form in which through the use of gores the reversely leading passages 18 are formed in the walls 2 of the eye cups, and again a passage is provided reversely extending inaccessible to rays of light from the front or side, but providing free ventilation and circulation of air.

Figures VII and VIII illustrate a further form of the goggle or protector provided with these reversely extending passages 19.

In Figure VII the lens is placed interiorly of the cup and retained in position by the locking ring 20 screwed into the inside of the cup in place of a cap member screwed on the outside, this allowing a slight reduction in the outside diameter of the lens retaining member.

Figure VIII shows the same molded skirt portion 21 overlying the passage 19 but with the cap 14 screwed exteriorly thereon to clamp in position the lens 12.

From the foregoing specification taken in connection with the accompanying drawings the construction of my improved goggle should be readily understood, and it will be seen that I have provided an improved construction which may be readily molded or formed, and in which correct ventilation with elimination of any light and heat radiations from the interior of the cup, is obtained.

I claim:

1. An eye protector including a composition cup portion formed with exterior grooves terminating in inwardly extending notches, and a lens retaining cup member fitting the cup and spanning the notches and grooves whereby the latter provide passages communicating with the interior of the cup.

2. A composition eye protector including non-metallic cup portions formed with integral laterally projecting lugs formed to receive connecting and head-engaging members, said cups being formed at their forward ends with lens-engaging seats and having relieved portions providing passages adjacent said seats, and retaining cup members overlying the lens and adjacent portion of the cups and in close engagement with the periphery of the cups but overlying the relieved portions whereby the latter provide ventilation passages.

In testimony whereof I have affixed my signature, in presence of two witnesses.

C. O. COZZENS.

Witnesses:
 ALICE G. HASKELL,
 E. M. LAFLER.